United States Patent [19]

Hoium et al.

[11] Patent Number: 5,559,294
[45] Date of Patent: Sep. 24, 1996

[54] TORQUE MEASURING DEVICE

[75] Inventors: Jonathan A. Hoium, North Mankato; Gregory L. Hasse, Mankato, both of Minn.

[73] Assignee: Condux International, Inc., Mankato, Minn.

[21] Appl. No.: 306,715

[22] Filed: Sep. 15, 1994

[51] Int. Cl.⁶ .................................................. G01L 5/00
[52] U.S. Cl. ......................................... 73/862.44; 73/862.18
[58] Field of Search ........................ 73/862.191, 862.26, 73/862.29, 862.18, 862.44

[56] References Cited

U.S. PATENT DOCUMENTS

| | | | |
|---|---|---|---|
| 2,024,147 | 12/1935 | Curtiss . | |
| 2,623,385 | 12/1952 | Jamieson | 73/862.29 |
| 2,845,795 | 8/1958 | Emmerling | 73/862.29 |
| 3,288,382 | 11/1966 | Dunn | 73/862.29 |
| 3,360,243 | 12/1967 | Betta . | |
| 3,595,074 | 7/1971 | Johnson | 73/862.29 |
| 3,903,738 | 9/1975 | Malchow | 73/862.29 |
| 3,978,718 | 9/1976 | Schorsch | 73/862.29 |
| 4,048,547 | 9/1977 | Havard et al. . | |
| 4,372,535 | 2/1983 | Gibson et al. . | |
| 4,458,880 | 7/1984 | Conti . | |
| 4,461,459 | 7/1984 | Conti . | |
| 4,628,747 | 12/1986 | Weitz et al. . | |
| 4,899,988 | 2/1990 | Mills . | |
| 5,197,338 | 3/1993 | Heiman et al. | 73/862.29 |

*Primary Examiner*—Richard Chilcot
*Assistant Examiner*—Ronald Biegel
*Attorney, Agent, or Firm*—Merchant, Gould, Smith, Edell, Welter & Schmidt, P.A.

[57] ABSTRACT

The present invention relates to directly measuring the torque applied to a capstan attached to an output shaft of a motor. The output shaft of the motor is rotatably mounted within a support. The motor includes a lever arm projecting therefrom. The lever arm coacts with a load cell to restrict the motor from rotating within the frame. As a torque is applied to the capstan, a proportional force is applied by the lever arm against the load cell. The force against the load cell can be calibrated to reflect the torque on the capstan.

14 Claims, 4 Drawing Sheets

5,559,294

TORQUE MEASURING DEVICE

FIELD OF THE INVENTION

The present invention relates to measuring torque applied to a capstan. Specifically, the invention directly measures a torque reaction of a motor which drives the capstan to determine the torque applied to the capstan.

BACKGROUND OF THE INVENTION

Within the field of placement of communications and power cables, precise measurement of torque applied to a cable pulling winch is critical to successfully placing a cable. Communications cables are often constructed from fiber optic cable, while power cables are often constructed from various metals. Cable pulling winches ordinarily are utilized to pull a cable through a conduit and utilize a capstan which is driven by a motor. The cable is affixed to a tow rope or line wrapped around the capstan, which rotates thereby pulling the cable. Traditionally, the motors used to pull cables are hydraulically or electrically driven.

The conduits through which the cables are pulled are ordinarily underground. Tension in the cable is a function of numerous factors. A major factor is friction. Friction forces are a function of the length of cable being pulled, the materials from which the cable and conduit are constructed, the number of curves or bends in the conduit, and the amount of added lubrication, among other things. The curves and bends affect the tension a great amount as the friction forces around them is much higher than straight portions of the conduit.

Additionally, as the cable is pulled, the tension throughout the length of the cable is not a constant value. For example, each time the cable passes a curve or bend, friction increases causing a corresponding increase in tension. The increases in tension are cumulative, meaning that the tension in the cable closest to the tow rope is higher than the tension in the cable initially entering the conduit. Further, the tension increases due to the weight of additional cable pulled.

Determining what the tension of the cable will be as a function of each of these factors is an impossible task. However, knowing the tension in the cable is critical to proper placement. As the tension in the cable increases, or if the cable gets stuck in the conduit as it turns or bends, the capstan will continue to pull on the cable thereby increasing the tension within the cable. The increasing tension may possibly lead to a fracture within the cable.

The cumulative affect of increasing the tension is also very important due to the fact that often times the length of the conduit is over one mile. The cumulative nature of the tension values leads to the possibility that the cable may fracture in the last few feet of the conduit. The prior art devices do not provide for accurate and easy measurement of the torque of the capstan or the increasing tensions in the cable.

As can be seen from the fact that fiber optic cables fracture relatively easily, accurate measurement of cable tension, at all times, is critical since over stressing the cable destroys the glass fibers. Some prior art devices have focused on determining the torque on the capstan and correlating that to the tension in the cable. These devices have focused on measuring the hydraulic pressures at the motor inlet. Some prior art devices which use electric motors have focused on measuring amperage. These systems after calibration can determine torque in the capstan by converting the hydraulic pressures, or amperage, into corresponding capstan torque values. However, temperature variations and the range of pressure affect the calibration of such systems. That is, the calibration of such a device changes during operation thus introducing error into the tension readings.

The use of the above-described prior art devices with fiber optic cables leads to inconsistent results. Because a significant calibration problem occurs over time, an apparently proper torque reading may in reality be a dangerously high torque at the capstan. Without any warning of a high torque condition the cable may fracture without the knowledge of the individuals placing it. Depending on the extent of the fracturing the problem may be detected during placement, soon thereafter or even later. Regardless of when it is detected the fractured cable will have to be replaced which involves significant expense. The significant expense would have been avoided if the high torque on the capstan would have been decreased when it became dangerously high.

Other prior art devices provide complicated mechanisms for the determination of torque on a capstan. For example, U.S. Pat. No. 3,360,243 to Betta and U.S. Pat. No. 4,372,535 to Gibson et al. disclose clutch-type mechanisms which measure the forces between two drums to approximate the tension in the cable. Additionally, U.S. Pat. No. 4,048,547 to Havard discloses a mechanism for controlling and adjusting the tension in a cable of mooring winches by measuring the torque exerted on a speed reducer interposed between the capstan and the motor. These devices are cumbersome to operate and introduce complicated components into the apparatus which may fail during operation.

An alternative to measuring the torque at the capstan is placing a load-cell directly in the cable itself, thereby directly measuring the tension in the cable. Typical in-line systems link the load cell between the capstan and the cable. The load cell signal is returned for processing via long conductors in the line. The in-line cell systems are delicate and inconvenient for routine field use.

Therefore, a need has arisen to provide an accurate torque measuring device which solves these and other problems in the prior art.

SUMMARY OF THE INVENTION

The present invention provides a torque measuring device for measuring torque on an output shaft of a motor. The device includes a support which rotatably receives the motor. Attached to the motor is a lever arm. A transducer constrains the lever arm thereby constraining the motor from rotation within the frame, so that when torque is applied to the output shaft the lever arm applies a force to the transducer which is proportional to the torque applied to the output shaft. The transducer may measure either compression or tension or both. A capstan may also be attached to the output shaft. In the preferred embodiment, a bearing block rotatably captures the motor at the output shaft and the bearing block is fixed to a frame.

DETAILED DESCRIPTION OF THE PREFERRED EMBODIMENT

In the following detailed description of the preferred embodiments, reference is made to the accompanying drawings which form a part hereof, and which show by way of illustration, specific embodiments in which the invention may be practiced. It is to be understood that the other embodiments of the invention may be utilized and structural changes may be made without departing from the scope of the present invention.

The present invention is directed towards a torque measuring device which measures torque on a capstan driven by a motor. The torque measuring device operates by directly measuring a torque reaction from the capstan on the motor. Specifically, the motor includes a housing and a rotatable drive shaft extending therefrom. A capstan is attached to the drive shaft for pulling a rope. A bearing block, supported by a frame, rotatably receives the drive shaft. The frame and bearing block support the motor, drive shaft and capstan.

The motor includes a fixed lever arm which is constrained by a transducer. Preferably, the transducer is a load cell. If torque is applied to the capstan by the drive shaft to pull the rope, the motor housing will tend to rotate. As a torque is applied to the capstan, the lever arm will be forced against the load cell, thus prohibiting the motor from rotating. The force placed against the load cell by the lever arm is directly proportional to the torque on the capstan.

Prior art motors are ordinarily supported at the housing of the motor by a fixed frame. The frame does not allow the motor to tend to rotate in response to a load applied to the capstan. Further, the first preferred embodiment of the present invention supports the motor and housing at the drive shaft, rather than the housing.

Figure 1:
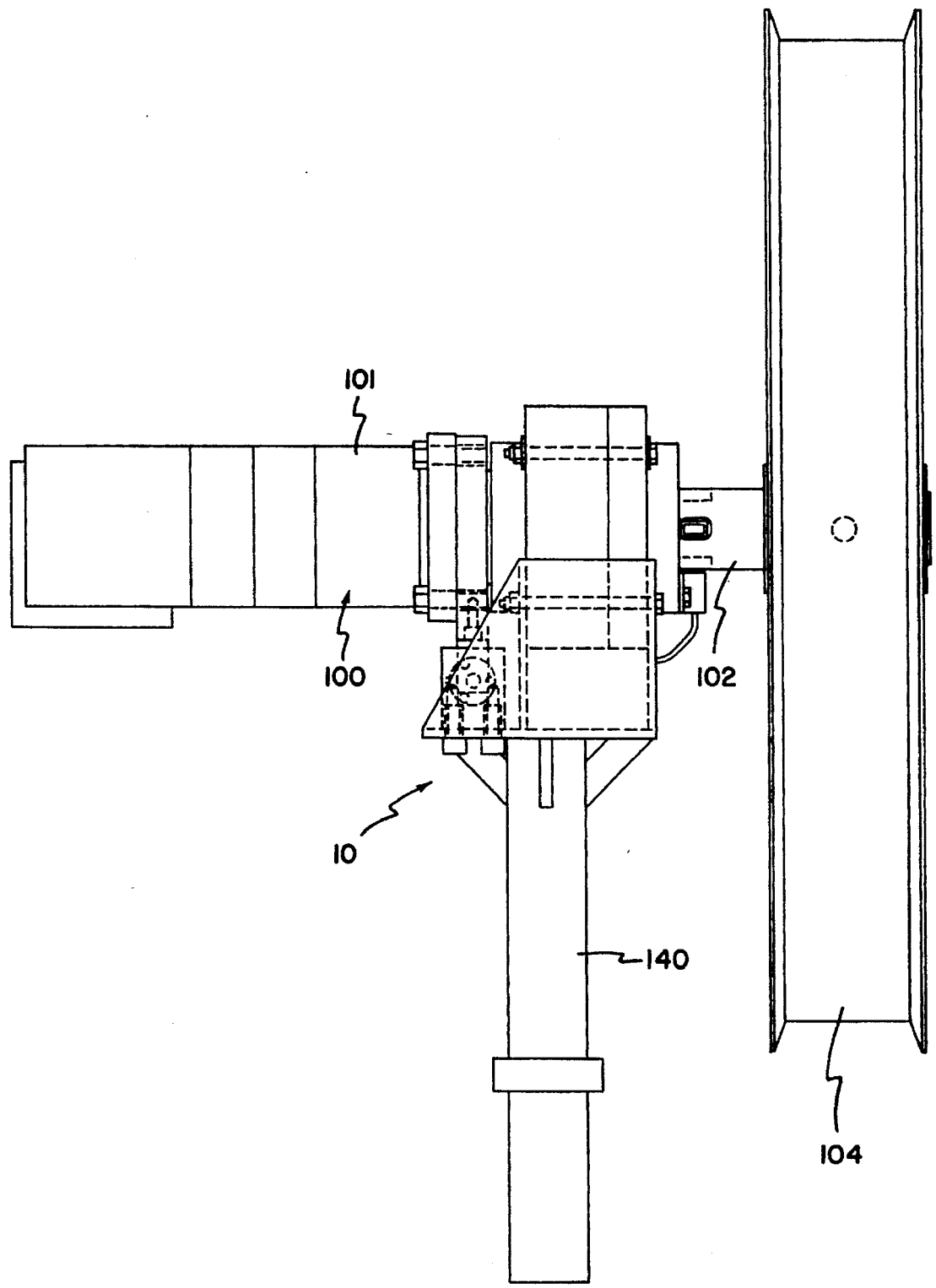
FIG. 1 is a side plan view of a motor constrained by a housing and a capstan attached to an output shaft.

Referring now to the Figures in which like elements are numbered alike, the present invention is shown. With reference to FIG. 1, there is shown a torque measuring device 10 having a motor 100 which includes a housing 101, an output shaft 102 and a capstan 104. Ordinarily, motor 100 is a hydraulic motor; however, use of other types of motors would be within the scope of the invention. Output shaft 102 includes an axis of rotation and rotates in response to motor 100.

Figure 4:
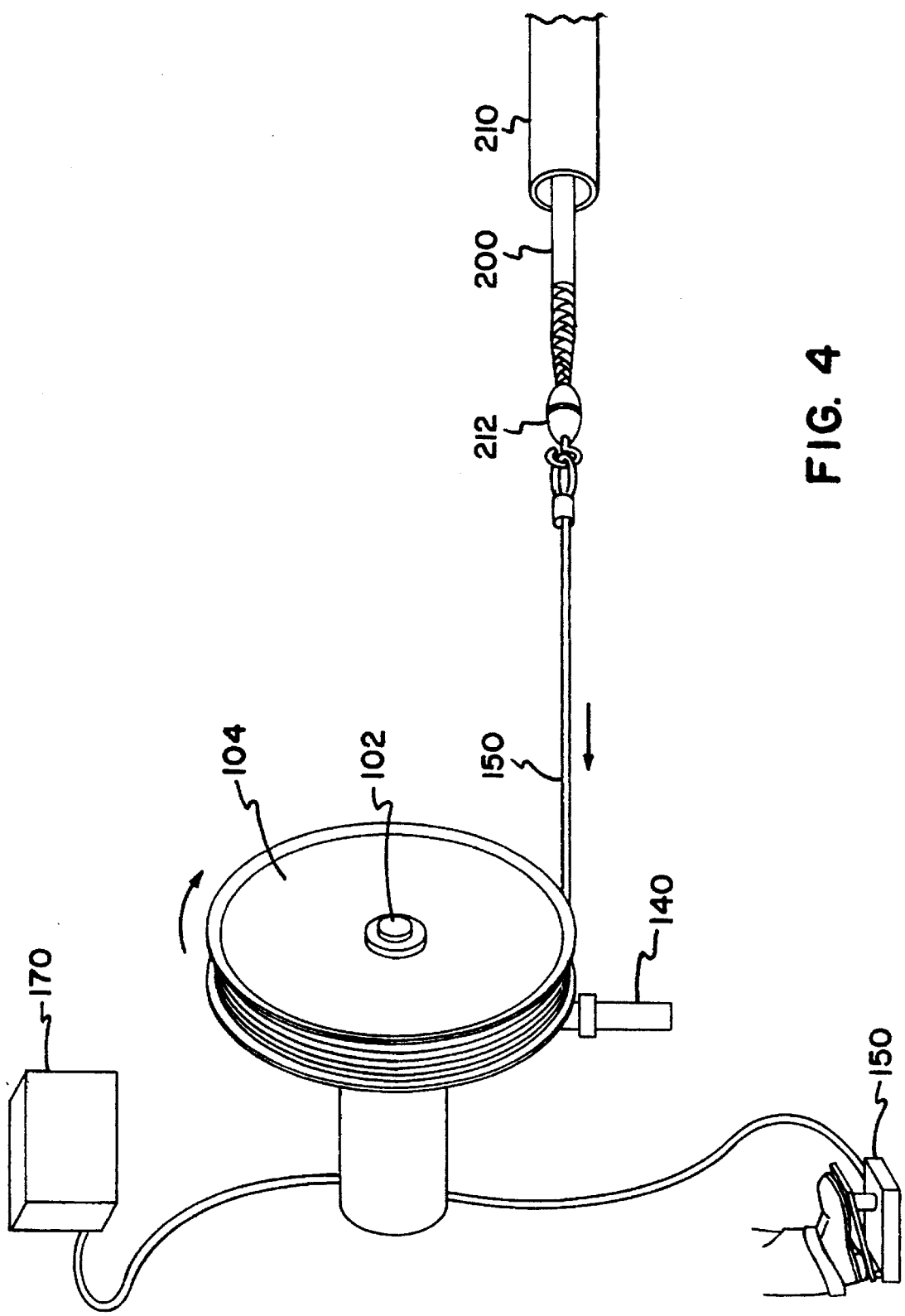
FIG. 4 is a perspective view of the capstan of FIG. 1 pulling cable through a conduit.

Referring to FIG. 4, capstan 104 is mounted on output shaft 102 and is constructed and arranged to receive a tow rope 150 which attaches to a cable 200, ordinarily a fiber optic cable, which is pulled through a conduit 210. A swivel 212 may be used to prevent twisting of the cable. Output shaft 102 and capstan 104 rotate about the axis of rotation of output shaft 102 with a variable level of torque. The torque depends upon numerous factors including the length of cable being pulled, the type of cable being pulled, the type and layout of conduit the cable is being pulled through and the distance the cable is being pulled. Torque is also affected by the diameter of the capstan. As the cable is pulled through the conduit the torque levels on the capstan increase due to, among other things, the friction caused by the additional cable being pulled. The present invention allows the torque on the capstan to be continuously monitored with a high degree of accuracy so that over stressing the cable can be avoided.

Figure 3:
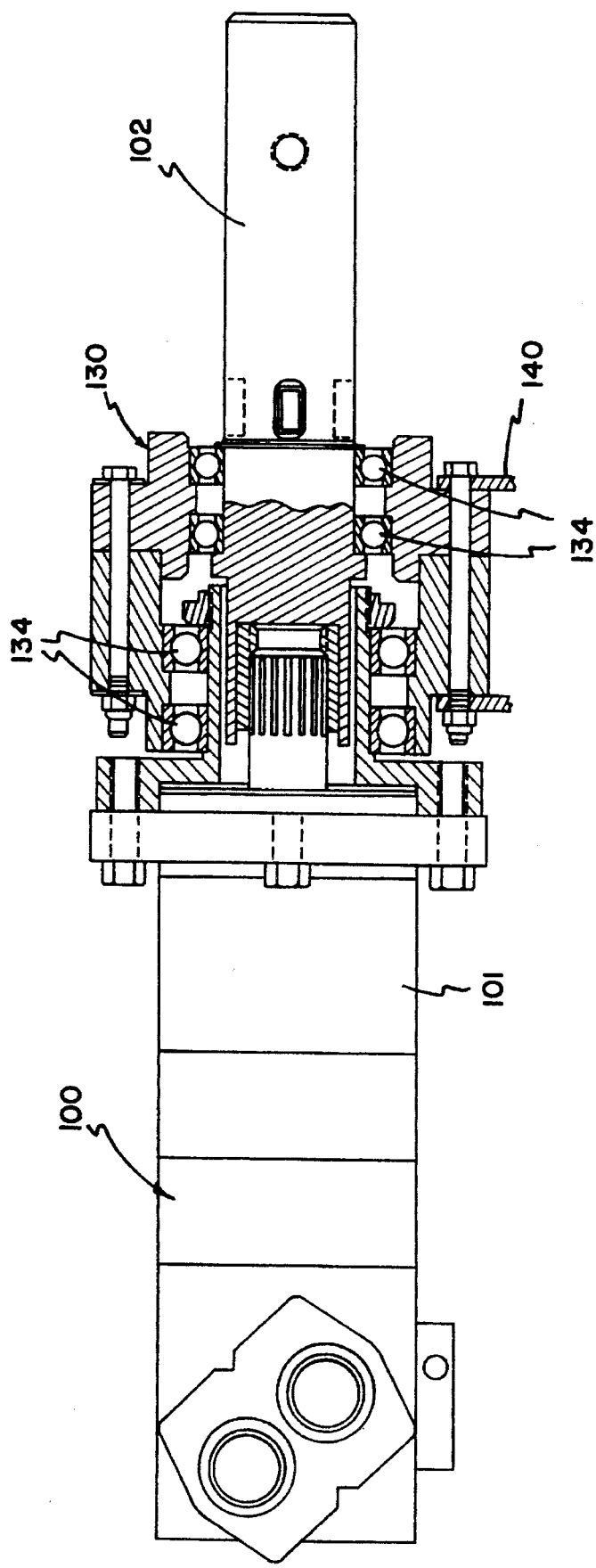
FIG. 3 is a side break-away view illustrating a bearing block.

Referring to FIG. 3, drive shaft 102 of motor 100 is rotatably mounted in bearing block 130. Bearing block 130 includes bearings 134 and rotatably supports motor 100. A frame 140 is attached to bearing block 130 to support bearing block 130 and motor 100. However, it is to be understood that drive shaft 102 may be rotatably supported in a variety of fashions, including but not limited to, bushings. It is also to be understood that instead of rotatably mounting the motor at drive shaft 102, the housing of motor 100 may be rotatably received within a bearing block, a bushing, or the equivalent, to accomplish the result of the present invention.

Figure 2:
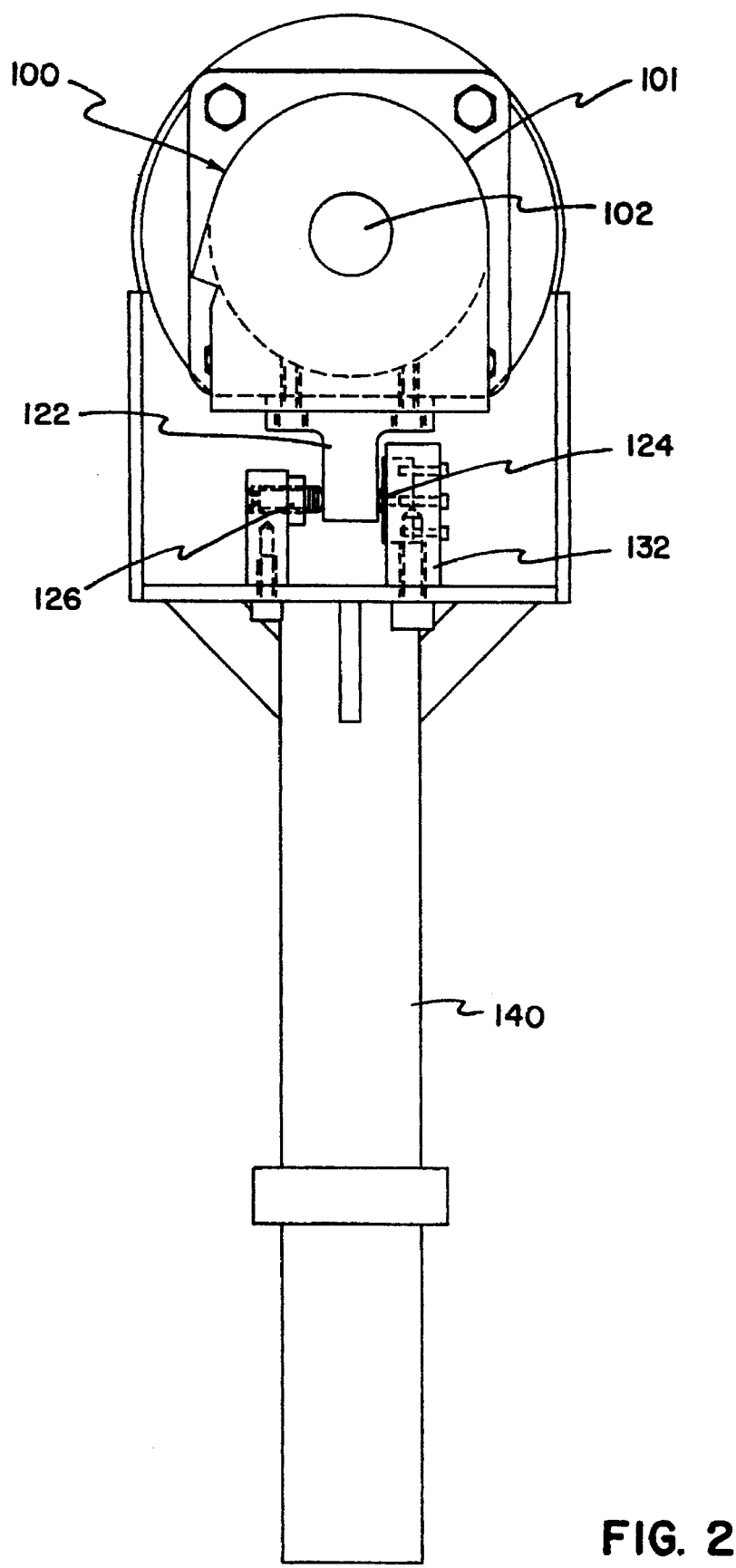
FIG. 2 is a rear plan view of the housing of FIG. 1 illustrating a load-cell constraining a lever arm attached to the motor of FIG. 1.

As best shown in FIG. 2, extending from housing 101 of motor 100 is a lever arm 122. Lever arm 122 may be constructed from any steel or aluminum and is preferably, constructed from ASTM A514 Steel. In the preferred embodiment, lever arm 122 extends perpendicularly away from the axis of rotation of drive shaft 102 and capstan 104. In the first preferred embodiment, lever arm 122 is constrained by a stop 126 and a transducer 124. In the first preferred embodiment, stop 126 is a set screw which provides for adjustment of the torque measuring device. In the first preferred embodiment, transducer is a compression load cell. Load cells with different capacities may be required depending upon the length of the lever arm diameter of the capstan or puller capacity. For example, for a 60 cubic inch hydraulic motor with a 30 inch capstan and a lever arm of approximately 4 inches long, a load cell having a range of 0–5,000 pounds is preferred. A 5,000 pound compression load cell may be purchased from Sensotec, 1200 Chesapeake Avenue, Columbus, Ohio 53212, under the "Model 53" designation.

In the second preferred embodiment, transducer 124 is a compression/tension load cell. Compression/tension load cells may also be purchased from Sensotec under the "Model 31" or "Model 34" designations. Both the Model 31 and Model 34 load cells are available in a wide range of force values, including load cells having a range of 0–5,000 pounds. With a compression/tension load cell, torque may be measured regardless of the direction in which capstan 104 is rotating.

When a load, i.e. a torque, is applied to capstan 104, motor 100 will want to rotate as its drive shaft 102 is rotatably captured by bearing block 130. However, because lever arm 122 of motor 100 is constrained by transducer 124, the motor will not rotate, but rather, lever arm 122 will exert a force against transducer 124. The force exerted against transducer 124 will be directly proportional to the torque on capstan 104. The force on transducer 124 can then be directly calibrated to the torque on the capstan, and the load cell forces can be converted to capstan torque.

With reference to FIG. 4, the speed of the capstan is preferably controlled by a foot control 150. Foot control 150 also includes an adjustable flow control valve (not shown) for adjusting the maximum pulling speed.

Force readings from transducer 124 are delivered to an electronic control box 170. Electronic control box 170 includes both visual and audible alarms and a paper chart recorder for continuously recording the tension in the pull line. A footage counter (not shown) may also be included to determine the approximate length of the cable installed. Electronic controller 170 may be programmed to a maximum tension limit which will stop motor 100 if the tension limit is exceeded. The tension limit may also trigger the audible and visual alarms.

Electronic control box 170 is preferably calibrated by attaching a dynamometer to the pull line. The dynamometer gives a reading of the tension in the pull line, which directly corresponds to the force exerted by lever arm 122 on transducer 124. The paper chart recorder may then be calibrated based upon readings from electric control box 170.

In the first preferred embodiment, lever arm 122 may be locked into place during transportation of the device to maintain calibration of the system.

Frame 140 can be configured in a variety of fashions. Depending upon the application, frame 140 may swivel about its axis or it may be stationary. Frame 140 may be mounted to a fixed structure or to a portable device.

The present invention includes substantial advantages over the prior art. The present invention provides for direct measurement of the torque on the capstan, and is not at the mercy of changes in the characteristics of hydraulic fluid or electric charges. Further, the device of the present invention is compact and does not interfere with the cable or add significant external structure to the motor or output shaft.

The above examples are not intended to limit the invention, but merely to serve as an illustration of how the invention might operate.

In light of the above teachings, it will be appreciated that several variations of the disclosed embodiments are possible. Those skilled in the art will no doubt be able to utilize the teachings of this invention other than as specifically described above. Certainly substitution of other materials would be obvious. Therefore, it is to be understood that the following invention is to be limited by the following claims.

What is claimed is:

1. A torque measuring device for measuring torque on an output shaft of a motor, said device comprising:

a support rotatably receiving said motor; said motor having an output shaft;

a lever arm extending from said motor;

a transducer for measuring the torque .applied to said output shaft, said transducer constraining said lever arm and said motor from rotating within said support, so that when a torque is applied to said output shaft said lever arm applies a force to said transducer which is proportional to said torque applied to said output shaft; and a capstan connected to said output shaft, said capstan operable in receiving cable.

2. A torque measuring device for measuring torque on an output shaft of a motor, said device comprising:

a support rotatably receiving said motor; said motor having an output shaft;

a lever arm extending from said motor;

a transducer for measuring the torque applied to said output shaft, said transducer constraining said lever arm and said motor from rotating within said support, so that when a torque is applied to said output shaft said lever arm applies a force to said transducer which is proportional to said torque applied to said output shaft;

a capstan connected to said output shaft, said capstan operable in receiving cable; and wherein said transducer is a load cell.

3. A torque measuring device as in claim 2 wherein said load cell measures compression.

4. A torque measuring device as in claim 2 wherein said load cell measures compression and tension.

5. A torque measuring device as in claim 2 further including a stop operative in constraining said lever arm.

6. A torque measuring device as in claim 5 wherein said stop is a set screw.

7. A torque measuring device for measuring torque applied to a capstan connected to an output shaft of a motor where said motor includes a housing, said torque measuring device comprises:

a bearing block attached to a frame, said motor rotatably received within said bearing block so that said motor is rotatable within said bearing block;

a lever arm extending from said motor; and a load cell fixed to said frame and constraining said lever arm so that when a torque is applied to said capstan a proportional force is applied to said load cell by said lever arm and reported by said load cell to an operator.

8. A torque measuring device as in claim 7 wherein said load cell is a compression load cell, 9. Torque measuring device as in claim 7 wherein said load cell operable and measurable tension and compression.

10. A torque measuring device as in claim 7 further comprising a stop which is operative in constraining said lever arm.

11. A torque measuring device as in claim 10 wherein said stop is a set screw.

12. A method of placing cable in a conduit comprising the steps of:

providing a motor having a housing and an output shaft with a capstan attached to said output shaft rotatably mounting said motor in a support constraining said motor within said support with a lever arm and a transducer, said transducer operative in producing a signal proportional to a torque value;

attaching said cable to said capstan pulling said cable on said capstan with said motor measuring said signal from said transducer.

13. A method of placing cable as in claim 12 further comprising the step of:

stopping said motor if said signal from said transducer exceeds a predetermined value.

14. A method of placing cable as in claim 12 wherein said motor is rotatably mounted at said housing of said motor.

* * * * *